Feb. 14, 1928.
R. D. HELLER
WEED SEED CATCHER
Filed Feb. 7, 1927
1,659,105
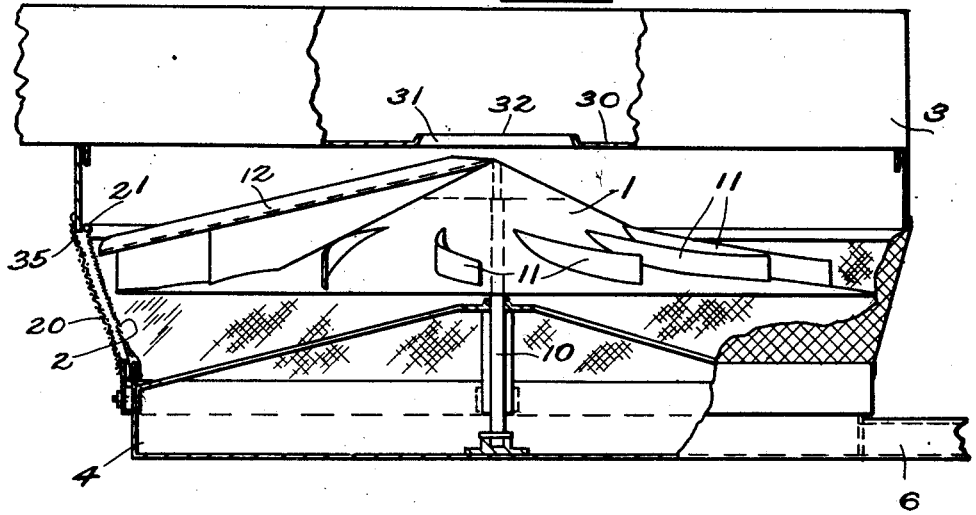
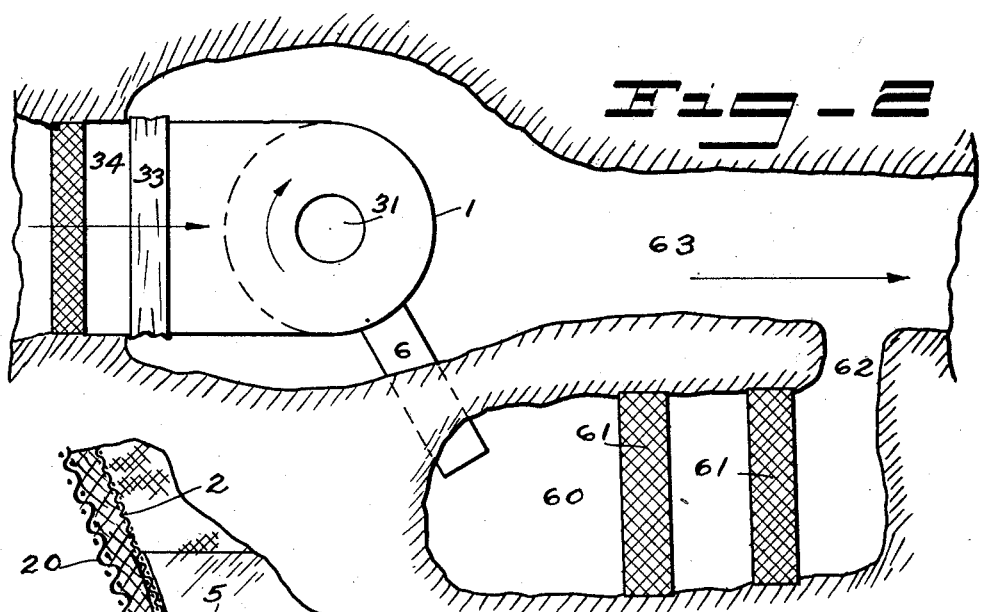
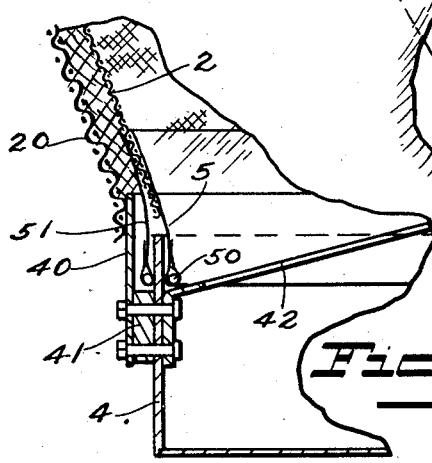
Inventor
Richard D. Heller
By H.L. & C.L. Reynolds
Attorneys Patented Feb. 14, 1928.

1,659,105

UNITED STATES PATENT OFFICE.

RICHARD D. HELLER, OF BOISE, IDAHO.

WEED-SEED CATCHER.

Application filed February 7, 1927. Serial No. 166,432.

My invention relates to devices employed in screening irrigation water, chiefly with the object of removing weed seeds therefrom.

The object of my invention is to remove noxious seeds from irrigation water, to thereby prevent seeding of irrigated lands, and to construct such means in such manner that the screening members may be conveniently removed and replaced, whether for cleaning or repairing.

My invention consists in certain novel construction and combination of parts, which will herein be described in a preferred form, and the novel features defined in the claims.

The accompanying drawings show my invention embodied in a preferred form of construction.

Figure 1 is an elevation of my device, mainly in section.

Figure 2 is a plan view showing a typical installation in an irrigating ditch.

Figure 3 is a vertical section through the lower edges of the screens, and the upper edges of the tub-like bottom member.

This invention is an improvement upon the device for a like purpose shown in my Patent No. 1,575,991 of March 9, 1926. Similar to the device shown in said patent, I employ a deflecting and distributing cone 1, which is mounted to turn upon a vertical pivot axis 10 and upon the apex of which the water being treated is discharged. This cone carries upon its upper surface curved deflecting ribs or vanes 11, upon which the falling water acts to cause the cone to slowly rotate. This distributing cone also carries a small flume 12, which discharges a small stream of water upon the screens 2 and 20 at a level somewhat higher that that of the water which flows over the surface of the conical distributor 1. The purpose sought is, by the stream of water discharged from the flume 12, to wash down seeds collecting upon the screens.

In the respects above mentioned, the construction is substantially the same as in my patent before mentioned. The means employed for discharging water thereon is somewhat different. A casing member 3 is employed, which extends upward above the cone 1 and has a floor 30 extending over the cone. This floor has a hole 31, centrally positioned over the apex of the cone, through which the water flows with an even distribution about the entire circle of said hole. Because of such even distribution, the maximum filtering or screening capacity may be obtained.

The casing 2, which may be called the head or discharge flume, is preferably made of heavy sheet metal, and I also prefer to turn up a slight flange 32 about the opening 31. At one side this casing is without a side wall and at this point is connected with the water supplying ditch. To do this a short section of canvas, as 33, may be used, this connecting the flume casing 1 with a short flume section, or equivalent construction, represented by 34.

Secured by their upper edges to the depending skirts of the flume casing 3, and positioned to receive the water discharged from the distributing cone, are the screens 2 and 20. These are frustro-conical in shape, the outer one, 20, of a coarse mesh, say four to the inch, and the inner one, 2, fine enough to catch and retain the seeds contained in the water. The two screens, 2 and 20, may be slightly separated, or in actual contact, in which latter case the outer screen acts as a stable support for the inner. This is not a vital feature.

The outer screen 20 is designed to be fixedly secured to the lower edge or skirt of the casing 3, and the inner screen removably secured thereto. A convenient manner of so securing the latter is by incorporating a hoop or bar 21 in its upper edge, and providing a slight inwardly projecting bead or flange 35 at the lower edge of the skirt.

The lower edges of these screens are designed to be secured in a similar relation, the outer one fixedly and the inner one removably. The inner screen should have its lower edge so positioned relative to the upper edge of the tub-like bottom portion 4, that all bodies caught by the inner screen, when washed off the screen, will be discharged into said tub. To facilitate securing a tight joint, as well as easy removability, I secure a strip of canvas, as 5, to the lower edge of the screen, and place this so as to hang down inside the tub 4. Such strip should also have a wire hoop 50 secured in its edge, said hoop being of a diameter to hold the canvas snugly against the side wall of the tub. I also prefer to secure a similar strip of canvas, 51, to the screen, this strip passing outside of the tub.

The lower edge of the outer screen 20 is secured to a metal band 40, which is of larger diameter than the tub and is secured in outer spaced relation thereto by spacing blocks 41 placed at intervals, thereby providing discharge outlets for the space between the screens. Brace rods 42 contribute stability to the tub walls and support the upper bearing for the shaft 10.

Extending from the tub 4 is a discharge or drainage flume 6, which discharges into a filter or screening pond or flume 60, across which are placed filter screens 61. The seeds and other particles washed down the screen 2 into the tub 4 are passed through flume 6 and caught on screens 61. These are easily cleaned, and the seeds destroyed. The water passes out through the channel 62 into the lower section 63 of the irrigation ditch.

A device designed as illustrated and described is capable of handling large volumes of water and effectively screening it of weed seeds. It operates to continually wash the seeds from the first screens into a compartment from which they are conveyed, together with a small quantity of water, to a screening compartment, where they are retained until manually disposed of.

What I claim as my invention is:

1. A weed seed separator for irrigation water, comprising a casing having an upper circular band and a tub-like bottom section separated to form a discharge zone between them, a screen adapted to cover said discharge zone, and a canvas band secured to the lower edge of the screen and extending below and within the upper edge of the tub.

2. A weed seed separator for irrigation water, comprising a casing having an upper circular band and a tub-like bottom section separated to form a discharge zone between them, a screen adapted to cover said discharge zone, and two canvas bands secured about the lower edge of said screen and adapted to extend below the upper edge of the tub, one within and one without the tub.

3. In a seed screen for irrigation water, a circular screen wall, a conical distributor with its discharge edge positioned to discharge upon said screen, and a water supply device containing a floor provided with a discharge opening positioned above the cone and concentric with its axis.

4. In a seed screening device for irrigation water, a supply flume having a hole in its bottom, and a distributing cone receiving the discharge from said hole.

Signed at Boise, Ada County, Idaho, this 28th day of January, 1927.

RICHARD D. HELLER.